United States Patent
Taraconat et al.

(10) Patent No.: US 12,196,662 B2
(45) Date of Patent: Jan. 14, 2025

(54) DEVICE FOR MEDICAL ANALYSES WITH IMPEDANCE SIGNAL PROCESSING

(71) Applicants: HORIBA ABX SAS, Montpellier (FR); CENTRE NATIONAL DE LA RECHERCHE SCIENTIFIQUE (C.N.R.S), Paris (FR); UNIVERSITE DE MONTPELLIER, Montpellier (FR)

(72) Inventors: Pierre Taraconat, Montpellier (FR); Damien Isebe, Grabels (FR); Simon Mendez, Montpellier (FR); Franck Nicoud, Restinclieres (FR)

(73) Assignee: HORIBA ABX SAS, Montpellier (FR)

( * ) Notice: Subject to any disclaimer, the term of this patent is extended or adjusted under 35 U.S.C. 154(b) by 625 days.

(21) Appl. No.: 17/606,101

(22) PCT Filed: Apr. 24, 2020

(86) PCT No.: PCT/EP2020/061564
§ 371 (c)(1),
(2) Date: Oct. 25, 2021

(87) PCT Pub. No.: WO2020/216952
PCT Pub. Date: Oct. 29, 2020

(65) Prior Publication Data
US 2022/0196538 A1    Jun. 23, 2022

(30) Foreign Application Priority Data
Apr. 25, 2019 (FR) ........................ 1904410

(51) Int. Cl.
*G01N 15/12* (2024.01)
*G01N 15/01* (2024.01)

(52) U.S. Cl.
CPC ............. *G01N 15/12* (2013.01); *G01N 15/01* (2024.01)

(58) Field of Classification Search
CPC ...................................................... G01N 15/12
See application file for complete search history.

(56) References Cited

U.S. PATENT DOCUMENTS

| | | | |
|---|---|---|---|
| 6,437,551 | B1 | 8/2002 | Krulevitch et al. |
| 9,121,806 | B1 | 9/2015 | Bhansali |
| (Continued) | | | |

FOREIGN PATENT DOCUMENTS

| | | | |
|---|---|---|---|
| CN | 1446597 A | | 10/2003 |
| CN | 109272027 A | | 1/2019 |
| (Continued) | | | |

OTHER PUBLICATIONS

M O Breitmeyer et al. "Model of red blood cell rotation in the flow toward a cell sizing orifice. Application to volume distribution" Biophysical journal, United States, Feb. 1, 1971 (Feb. 1, 1971), pp. 146-157.

(Continued)

*Primary Examiner* — Patrick O Neill
(74) *Attorney, Agent, or Firm* — Volpe Koenig (57) ABSTRACT

A device for medical analyses with cellular impedance signal processing comprises a memory (4) arranged to receive pulse data sets, each pulse data set comprising impedance value data that are associated each time with a time marker, these data together representing a curve of cellular impedance values that are measured as a cell passes through a polarized opening, a computer (6) arranged to process a pulse data set by determining a rotation value indicating whether the cell from which this pulse data set has been taken has undergone a rotation during its passage through the polarized opening, and a classifier (8) arranged (Continued)

to retrieve from the computer (6) a given pulse data set, and to use the resulting rotation value to classify the given pulse data set in a rotation pulse data set group (10) or a rotationless pulse data set group (12).

10 Claims, 3 Drawing Sheets

(56) References Cited

U.S. PATENT DOCUMENTS

| | | | |
|---|---|---|---|
| 2004/0171164 A1 | 9/2004 | Li et al. | |
| 2007/0143033 A1* | 6/2007 | Zhang | G01N 35/00584 702/180 |
| 2013/0184605 A1 | 7/2013 | Ching | |
| 2019/0024114 A1 | 1/2019 | Bauer | |

FOREIGN PATENT DOCUMENTS

| | | |
|---|---|---|
| CN | 109752307 A | 5/2019 |
| EP | 0138591 A2 | 10/1984 |
| JP | 2001250037 A | 9/2001 |
| JP | 2002087043 A | 3/2002 |
| JP | 2007520708 A | 7/2007 |
| JP | 2017183027 A | 10/2017 |
| WO | 2013164676 A1 | 11/2013 |
| WO | 2015123603 A1 | 8/2015 |

OTHER PUBLICATIONS

Grover et al. "Electrical sizing of particles in suspensions: I. theory." Biophysical Journal, 9:1398-1414, 1969.

Hurley "Sizing particles with a Coulter counter" Biophysical Journal, 10:74-79, 1970.

Office Action issued in corresponding Chinese Patent Application No. 202080030889.1on May 22, 2024, consisting of 12 pp. (English Translation Provided).

Tang Wenlai. Development and Application of the Microfluidic Single-Cell Impedance Detection Systems. Doctoral Dissertation. School of Mechanical Engineering, Southeast University. Sep. 2017. 133 pp.

Bryce Chiang, et al. Design and Performance of a Multichannel Vestibular Prosthesis That Restores Semicircular Canal Sensation in Rhesus Monkey. IEEE Transactions on Neural Systems and Rehabilitation Engineering, vol. 19, No. 5. Oct. 5, 2011. pp. 588-598.

\* cited by examiner

DEVICE FOR MEDICAL ANALYSES WITH IMPEDANCE SIGNAL PROCESSING

FIELD OF THE INVENTION

The invention relates to the field of hematology, and in particular cell counting apparatuses.

BACKGROUND

Since the 1950s, the counting and volumetry of the different blood cells in hematology systems are performed by impedance measurement, according to a method known as the Coulter Principle. This method consists of passing the cells in suspension in a conductive liquid through a polarized micro-opening and detecting the electrical resistance variations (or impedance variations) induced by particle passages in the opening. The detection of the different pulses thus generated makes it possible to count the elements.

Analytical developments have been described in the literature by several authors, including Grover et al in "Electrical sizing of particles in suspensions: I. theory." Biophysical Journal, 9:1398-1414, 1969 and Hurley in "Sizing particles with a Coulter counter" Biophysical Journal, 10:74-79, 1970 which teach how the amplitude of the electrical interference makes it possible to retrieve the volume of the cell in certain cases according to the formula: $U=(r \cdot fs \cdot i)V/S^2$, where U is the voltage variation at the electrode terminals, V the volume of the particle, S the opening cross-section, r the electrical conductivity of the medium, i the constant imposed current, and fs the shape factor of the cell which is dependent on the orientation and the shape thereof.

This formula makes it possible to construct the volume distribution of the cells analyzed subject to a homogeneous electrical field, of a much smaller cell size than that of the opening and a constant shape factor. For example, in the case of Red Blood Cells (RBCs), the Mean Corpuscular Volume (MCV) and a Distribution Index (DI) are defined based on the pulse height distribution, and represent significant hematological parameters. This formula also makes it possible to retrieve the actual volume, by multiplying the volume V by a coefficient involving the shape factor fs.

These calculations are based on the assumptions that the shape factor fs is constant, and that the electrical field is homogeneous. However, in conventional devices, these assumptions are generally not observed. Indeed, on the one hand, the electric field is inhomogeneous (it is stronger close to the edges), and, on the other hand, when the cells pass close to the walls, the hydrodynamic effects are substantial (particularly due to shear stress) and they can rotate or adopt complex shapes. In these cases, the shape factor changes, relative to cell passages at the center, and must be corrected if one wants to find a correct actual volume.

In current devices, the shape factor is not corrected according to the cell trajectory, and the associated impedance signals of the cell passages close to the walls have pulse heights resulting in an overestimation of cell volumes due to electrostatic and/or hydrodynamic artifacts.

For this reason, the volume distributions obtained are generally dissymmetrical, with a longer tail on the right (known as "right-skew" distribution), and the measurement of the volumetric parameters of the cells (MCV and DI) is distorted thereby.

Several solutions have been proposed to solve these problems:
  spherising the red blood cells makes it possible to cancel the impact on the shape factor, but involves the development of a specific reagent to modify the osmolarity,
  extending the opening makes it possible to homogenize the electrical field, but generates substantial impedance losses and a higher risk of coincident passages (when two cells pass through the opening at the same time, which renders them indistinguishable),
  sorting the pulses to remove those corresponding to the cell trajectories close to the edges, but these methods, based on the pulse width, are not effective, even when the pulse height is taken into account (particularly when the cell size varies), and they do not allow identification of cell rotation information.

As none of these solutions was satisfactory, hydrodynamic focusing technology, or hydrofocusing was developed. This solution consists of hydrodynamic sheathing of the flow of cells to be analyzed, which makes it possible to center it in the opening and limit the effects associated with edge passages. This technique is nonetheless very complex to implement and particularly costly.

The invention improves the situation.

SUMMARY

To this end, the invention relates to a device for medical analyses with cellular impedance signal processing, comprising a memory arranged to receive pulse data sets, each pulse data set comprising impedance value data that are associated each time with a time marker, these data together representing a curve of cellular impedance values that are measured as a cell passes through a polarized opening, a calculator arranged to process a pulse data set by determining a rotation value indicating whether the cell from which this pulse data set has been obtained has undergone a rotation during its passage through the polarized opening, and a classifier arranged provide the calculator with a given pulse data set, and to use the resulting rotation value to classify the given pulse data set in a rotation pulse data set group or a rotationless pulse data set group.

This device is advantageous because, by taking the rotationless pulse data set group into account, it makes it possible to obtain similar results to those that can be obtained on hydrofocused systems, but with a considerably lower cost and complexity of use.

Alternatively, the device according to the invention can have one or more of the following features:
  the calculator is arranged to process a pulse data set by:
    determining a maximum impedance value of the pulse data set,
    calculating an upper impedance value by multiplying the maximum impedance value by an upper coefficient chosen in the range [0.7; 0.95], and by determining in the pulse data set the time markers for which the associated impedance value in the pulse data set is equal to the upper impedance value, and by calculating an upper duration corresponding to the maximum duration between these time markers,
    calculating a lower impedance value by multiplying the maximum impedance value by an upper coefficient chosen in the range [0.1; 0.6], and by determining in the pulse data set the time markers for which the associated impedance value in the pulse data set is equal to the lower impedance value, and by calculating a lower duration corresponding to the maximum duration between these time markers, returning a rotation value determined from a ratio calculated from the upper duration and the lower duration, the upper coefficient is chosen in the range [0.8; 0.9], the lower coefficient is chosen in the range [0.3; 0.6], the upper coefficient equals 0.875 and the lower coefficient equals 0.5, the calculator returns a rotation value equal to the division of the upper duration by the lower duration, and wherein the classifier is arranged to classify a pulse data set for which the rotation value is strictly less than 0.45 in the rotation pulse data set group and to classify a pulse data set for which the rotation value is greater than 0.45 in the rotationless pulse data set group, the calculator is a neural network comprising, on one hand, a converter arranged to process a pulse data set to adapt it with a view to processing by a neural network, arranged to make the time markers and the impedance values dimensionless and resample the dimensionless data to a chosen number of impedance values for the neural network, and, on the other, a multilayer perceptron for which the input layer comprises an input for each value from the resampling performed by the converter, at least one hidden layer, and an output layer to determine a rotation value, the input layer further comprises an input receiving the width of the pulse data set processed by the converter, the multilayer perceptron comprises a hidden layer comprising 20 neurons, and the activation function of these neurons is the sigmoid function, the multilayer perceptron is trained by stochastic gradient descent after error gradient back propagation, the training error being calculated from a cost function based on the root mean square error, and the outputs being set to 0 for the inputs for which the associated pulse data set have a cellular orientation greater than 0.3 rad for the maximum impedance value of the impedance values of this pulse data set, and 1 otherwise.

The invention also relates to a method for processing medical analysis impedance signals, comprising the following operations:

a. receiving pulse data sets, each pulse data set comprising impedance value data that are associated each time with a time marker, these data together representing a curve of cellular impedance values that are measured as a cell passes through a polarized opening, b. processing a pulse data set from operation a. by determining a rotation value indicating whether the cell from which this pulse data set has been obtained has undergone a rotation during its passage through the polarized opening, c. classifying a pulse data set in a rotation pulse data set group or in a rotationless pulse data set group according to the rotation value obtained in operation b.

In various alternative embodiments, the method may have one or more of the following features:

operation b. comprises:

b1. determining a maximum impedance value of the pulse data set, b2. calculating an upper impedance value by multiplying the maximum impedance value by an upper coefficient chosen in the range [0.7; 0.95], and by determining in the pulse data set the time markers for which the associated impedance value in the pulse data set is equal to the upper impedance value, and by calculating an upper duration corresponding to the maximum duration between these time markers, b3. calculating a lower impedance value by multiplying the maximum impedance value by an upper coefficient chosen in the range [0.1; 0.6], and by determining in the pulse data set the time markers for which the associated impedance value in the pulse data set is equal to the lower impedance value, and by calculating a lower duration corresponding to the maximum duration between these time markers, and b4. returning a rotation value determined from a ratio calculated from the upper duration and the lower duration, the upper coefficient is chosen in the range [0.8; 0.9], the lower coefficient is chosen in the range [0.3; 0.6], the upper coefficient equals 0.875 and the lower coefficient equals 0.5, operation b4. returns a rotation value equal to the division of the upper duration by the lower duration, and operation c. classifies a pulse data set for which the rotation value is strictly less than 0.45 in the rotation pulse data set group and to classify a pulse data set for which the rotation value is greater than 0.45 in the rotationless pulse data set group, operation b. is carried out by a neural network comprising, on one hand, a converter arranged to process a pulse data set to adapt it with a view to processing by a neural network, arranged to make the time markers and the impedance values dimensionless and resample the dimensionless data to a chosen number of impedance values for the neural network, and, on the other, a multilayer perceptron for which the input layer comprises an input for each value from the resampling performed by the converter, at least one hidden layer, and an output layer to determine a rotation value, the input layer further comprises an input receiving the width of the pulse data set processed by the converter, the multilayer perceptron comprises a hidden layer comprising 20 neurons, and the activation function of these neurons is the sigmoid function, the multilayer perceptron is trained by stochastic gradient descent after error gradient back propagation, the training error being calculated from a cost function based on the root mean square error, and the outputs being set to 0 for the inputs for which the associated pulse data set have a cellular orientation greater than 0.3 rad for the maximum impedance value of the impedance values of this pulse data set, and 1 otherwise.

BRIEF DESCRIPTION OF THE DRAWINGS

Further features and advantages of the invention will emerge more clearly on reading the following description, based on examples given by way of illustration and not limitation, based on the drawings wherein.

DETAILED DESCRIPTION OF THE PREFERRED EMBODIMENTS

The drawings and the description hereinafter contain, essentially, elements of a definite nature. Therefore, they may not only serve to help to better understand the present invention, but also contribute to the definition thereof, where applicable.

Figure 1:
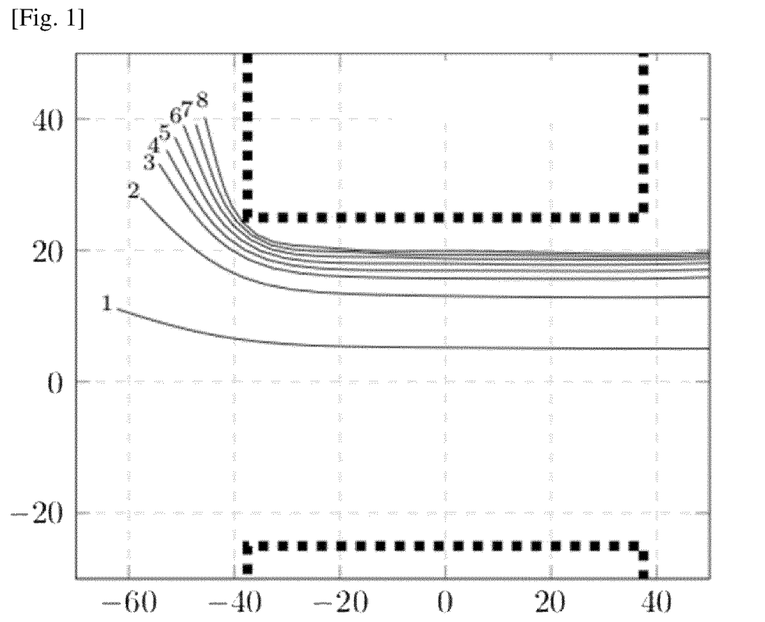
FIG. 1 represents a principle view of the measurement opening within the scope of the invention, as well as the trajectories that a cell can take therein.

FIG. 1 represents a principle view of the measurement opening within the scope of the invention, as well as the trajectories that a cell can take therein. The opening has walls represented as dotted lines, the x-coordinate and the y-coordinate being expressed in µm.

Figure 2:
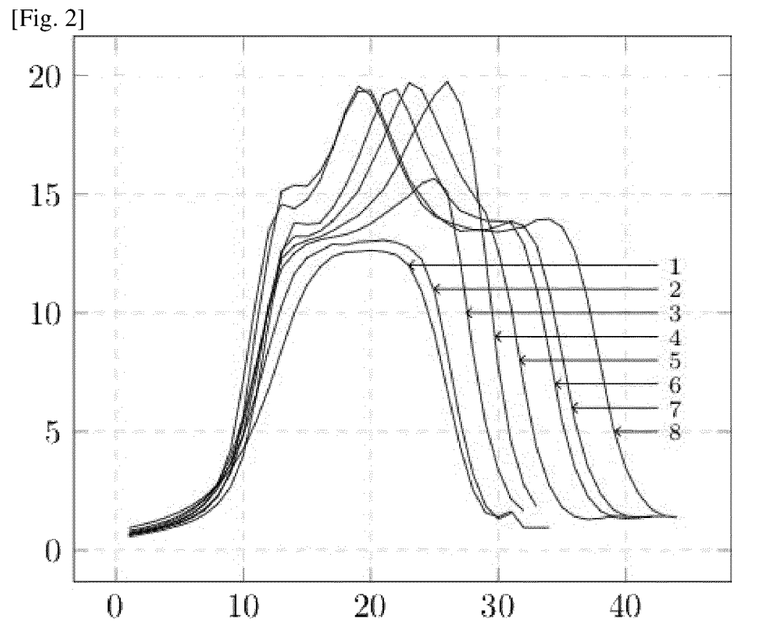
FIG. 2 represents pulse measurements for the trajectories of FIG. 1.

FIG. 2 represents impedance pulse measured for the trajectories of FIG. 1. The x-coordinate is expressed in µs, whereas the y-coordinate is expressed in Ohm. As can be seen, the closer the incident trajectory of a cell is to one of the walls of the opening, the more chaotic the measurement, causing errors explained in the introduction.

The Applicant conducted advanced simulation work, enabling it to identify the fact that volume overestimations are directly linked with rotational movements of cells in the micro-opening. In other words, characterizing the rotation using impedance signals and implementing filtering methods based on this rotation provide a much more robust measurement of the volumetric parameters of the cells than conventional filtering processes based on height and width analyses, and comparable results to hydrofocused systems.

More particularly, the Applicant identified in its simulations that a cell that follows a trajectory close to a wall, and which has in response a complex pulse, systematically undergoes a rotation when passing through the opening. It is therefore useful to remove the pulses for which it is identified that a cell has undergone a rotation for the purposes of calculating the MCV and the DI reliably and accurately.

None of the work of the prior art had established with precision the correlation between the non-exploitability of the pulses and the presence of a rotation of the cell, and none of this work disclose a means to identify whether a cell has undergone a rotation in the opening from the impedance pulse thereof.

The Applicant identified two methods for determining and/or quantifying reliably whether a cell has undergone a rotation in the opening.

The first method is based on the processing of the signal, which is intended to determine the presence of a peak in the impedance pulse measured. Indeed, the cells which pass at the center of the opening and for which the impedance pulses are useful for calculating an MCV and a reliable DI have bell-shaped impedance pulses, like the trajectories 1 and 2 in FIG. 1. The other trajectories induce pulses having a peak which corresponds to the rotation closest to 90° for the cell in the opening. This method will be commented with reference to the first embodiment.

The second method is based on a neural network trained to recognize impedance pulses associated with trajectories 1 and 2 of FIG. 1. This method will be commented with reference to the second embodiment.

Figure 3:
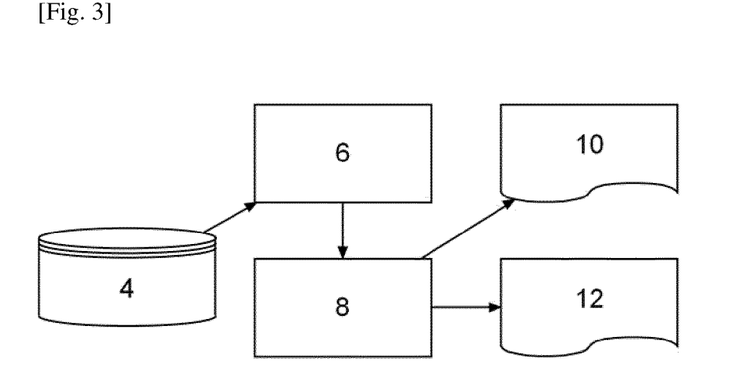
FIG. 3 represents a diagram of a first embodiment of a device according to the invention.

FIG. 3 represents a diagram of a first embodiment of a device according to the invention. In this embodiment, the device comprises a memory 4, a calculator 6 and a classifier 8.

The memory 4 can be any type of data storage capable of receiving digital data: hard drive, flash memory hard drive (SSD), flash memory in any form, random access memory, magnetic disk, storage distributed locally or in the cloud, etc. The data calculated by the device can be stored on any type of memory similar to the memory 4, or thereon. These data can be deleted after the device has performed its tasks or saved.

In the example described here, the memory 4 receives pulse data sets. A pulse data set represents the group of data that can be used to characterize an impedance pulse represented in FIG. 2. Therefore, it is a set of pairs (measured impedance value; time marker), which together define a curve such as those in FIG. 2. In practice, the pulse data set will be generally a sampling of the detection output of the orifice. The pulse data set can also be a continuous curve, in which case the calculator 6 will be adapted accordingly.

The calculator 6 and the classifier 8 are elements accessing directly or indirectly the memory 4. They can be embodied in the form of a suitable computing code executed on one or more processors. The term processors refers to any processor suitable for the calculations described below. Such a processor can be embodied in any known manner, in the form of a personal calculator microprocessor, a dedicated chip of FPGA or SoC ("system on chip") type, a computing resource on a grid or in the cloud, a microcontroller, or any other form capable of supplying the computing power required for the embodiment described hereinafter. One or more of these elements can also be embodied in the form of specialized electronic circuits such as an ASIC. A combination of processor and electronic circuits can also be envisaged.

It is worth noting that the device according to the invention can advantageously be integrated in a hematological analysis device, or be separate. It can therefore be fully integrated in the hematological analysis device or for example be a Web service to which the hematological analysis device connects when necessary or desired.

As stated, the memory 4 receives the pulse data sets measured when the cells pass through the opening. The classifier 8 is then arranged to call the calculator 6 in order to determine a rotation value for the pulse data set which has just been measured, or for another pulse data set which is stored in the memory 4. Based on the rotation value calculated by the calculator 6, the classifier 8 classifies the pulse data set in a rotation pulse data set group or in a rotationless pulse data set group. Once these pulse data set groups have been established, it is possible for a hematology device to use the rotationless pulse data set group to determine the MCV and the DI reliably. Note that the MCV is obtained by keeping the pulses 10% above the maximum pulse value, and by averaging the resulting volumes, and the DI is obtained by multiplying the standard deviation of the pulses used to calculate the MCV, multiplying it by 100 and dividing the whole by MCV. Alternatively, the 10% value can be reduced to 2%.

The calculator 6 is arranged to process the pulse data set in order to calculate a value indicating whether the cell has undergone a rotation. For this, the Applicant observed the different pulse shapes according to the trajectories and inferred a value which makes it possible to reliably separate both cell populations. For this, it established a value called WR. The value WR is a ratio between two pulse widths. These widths, taken at particular times, make it possible to indicate the presence of a peak in the pulse, or on the other hand a bell-shaped pulse.

For this, the calculator 6 first determines the maximum pulse height in the pulse data set. The maximum height is used to calculate an upper impedance value and a lower impedance value.

The upper impedance value is obtained by multiplying the maximum impedance value (which corresponds to the maximum height) by an upper coefficient. This upper coefficient serves to determine two times which, in general, make it possible to correctly approximate the width of the impedance peak of a pulse. For this, the upper coefficient is chosen in the range [0.7; 0.95], and preferably [0.8; 0.9], which ensures that at least two times are obtained, and that these times indeed correspond to the pulse peak (in order to limit the scenarios where several peaks are present).

Thus the upper impedance value is less than the maximum impedance value and greater that 70% thereof. The Applicant's work demonstrated that this range makes it possible to capture the peaks of the pulses produced. The Applicant identified that the value of 0.875 is particularly advantageous and gives the best results: it makes it possible to estimate the pulse peaks in the most accurate way. Indeed, the peaks around the maximum height are generally relatively narrow.

The lower impedance value is obtained by multiplying the maximum impedance value by a lower coefficient. This lower coefficient serves to determine two times which, in general, make it possible to correctly approximate the impedance pulse width. For this, the lower coefficient is chosen in the range [0.1; 0.6], and preferably [0.3; 0.6] which ensures that two times are obtained, and that these times correspond to the general pulse width.

Thus the lower impedance value is between 30% and 60% of the maximum impedance value. The Applicant's work demonstrated that this range makes it possible to capture the width of the pulses produced correctly by removing the noise. The Applicant identified that the value of 0.5 is particularly advantageous and gives the best results: the slopes of the pulses below 50% of the maximum height are very steep, and this value makes it possible to prevent any risk of measurement subject to noise.

Once the upper impedance value and the lower impedance have been determined, the calculator 6 determines the duration between the two times of the pulse data set which are at the greatest temporal distance from each other, and which respectively have the upper impedance value or the lower impedance value. The duration associated with the upper impedance value is known as the upper duration, and the duration associated with the lower impedance value is referred to as the lower duration. Instinctively, it appears that the upper duration corresponds substantially to the width of the impedance peak of a pulse data set, and that the lower duration corresponds substantially to the pulse width.

Finally, the calculator 6 determines the rotation value by calculating the ratio between the upper duration and the lower duration. Here again, it is instinctive that a low rotation value indicates the presence of a peak (and therefore a rotation), while a high rotation value indicates a bell-shaped pulse. It is obvious that the ratio could be inverted (and as such the conclusions). Similarly, the rotation value could be calculated on the basis of this high ratio at a selected power or of an exponential of this ratio.

The Applicant's simulations showed that the value of 0.45 for the rotation value is very discriminatory, and makes it possible to separate the cells having a similar trajectory to trajectories 1 and 2 of FIG. 2 of the other cells (the scale of FIG. 2 is between 0 and 100 for the WR values between 0 and 1). Therefore, this threshold is used by the classifier 8 to place the pulse data set in the rotation pulse data set group or in the rotationless pulse data set group.

It is obvious that a person skilled in the art will know how to adapt the upper coefficient, the lower coefficient, the use of a power for the calculation of the rotation value as well as the threshold for the classifier.

It is also possible to perform several calibration tests to optimize the choice of the upper coefficient, the lower coefficient and the threshold. Indeed, it is known that the rotationless pulse data set group should have a Gaussian distribution. Insofar as the calculation costs are relatively insubstantial, it could be envisaged that the calculator 6 operate with several pairs of upper coefficient and lower coefficient, and that the pair which makes it possible to obtain "the most Gaussian" distribution at the output is retained.

Figure 4:
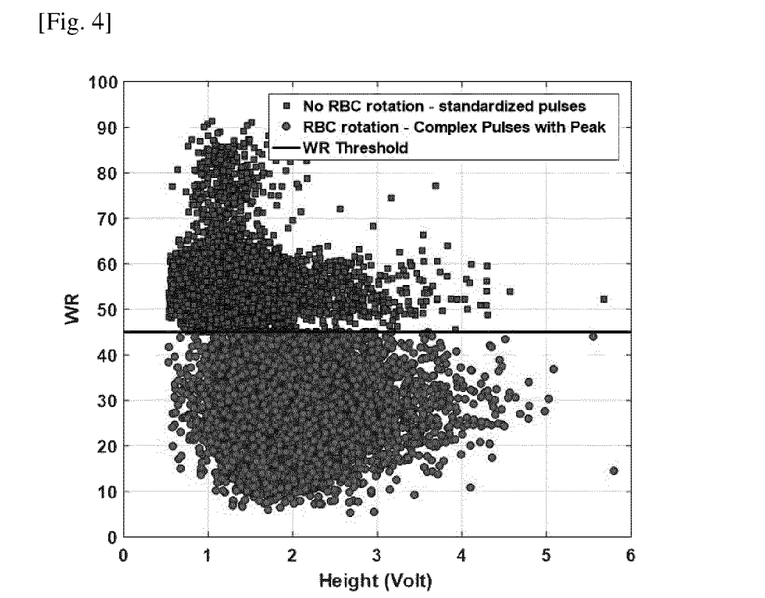
FIG. 4 represents an example classification performed by the device in FIG. 3 on a sample of human blood and its comparison with the actual corresponding pulse distribution.

FIG. 4 represents an example of classification by the device according to the invention for an experimental pulse acquisition performed using a blood sample from a healthy patient. The pulses were studied manually to classify them manually, separately from the processing thereof by the device according to the invention. In this figure, the square dots indicate a bell-shaped pulse, and the rounded dots a pulse with a peak. It is clear that the device discriminates between the two pulse populations with a very high precision.

Figure 5:
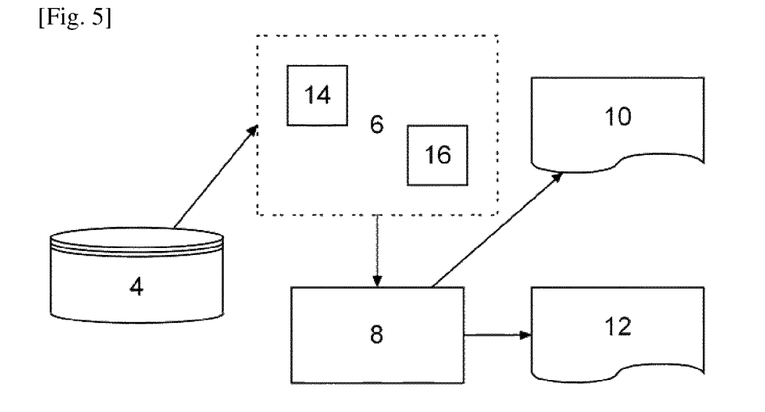
FIG. 5 represents a diagram of a second embodiment of a device according to the invention.

The second embodiment will now be described with reference to FIG. 5. In this embodiment, the calculator 6 is no longer centered on the signal processing, but is a neural network. Indeed, the pulses can be compared to images, and, with suitable training, the Applicant considered that a neural network could be particularly effective for classifying pulses in rotation and rotationless pulse data set groups.

For this, the calculator 6 comprises a converter 14 and a multilayer perceptron 16. Indeed, the pulses have very diverse widths and amplitudes, and it is therefore necessary to standardize them with an operation to make them dimensionless so as to make the training of the multilayer perceptron 16 and the quality of the detection thereof reliable. Thus, the converter 14 is arranged to receive a pulse data set and to perform an operation to make dimensionless in amplitude and in time.

For the dimensionless in amplitude operation, the pulse data set is standardized with the maximum amplitude value of the data set. This results in a pulse data set which has values between 0 and 1.

For the dimensionless in time operation, the Application relied on the shape of the pulses. Indeed, as mentioned above, the slope of the pulses is very substantial close to the edges. Accordingly, considering the pulse width at 50% of the maximum impedance value, a correct estimation of the width is obtained. Thus, the converter 14 scales the pulse data set based on this width. In order to ensure that the resulting pulse data set contains enough data points for the multilayer perceptron 16, the temporally dimensionless pulse data set can be resampled if required.

The operation to make dimensionless in amplitude and in time can be carried out sequentially (amplitude then time, or time then amplitude) or simultaneously.

Once the pulse data set has been formatted for the multilayer perceptron 16, it is processed by the latter, which returns a rotation value between 0 and 1 in the example described here. The multilayer perceptron 16 comprises in the example described here an input layer, a hidden layer and an output layer. The input layer comprises an input number which is equal to the number of samples of the pulse data set formatted by the converter 14 plus an input which receives the pulse width. The Applicant established that the input relating to the pulse width is not essential (it is therefore optional), but that it makes it possible to nonetheless to obtain the best results. In the example described here, the number of samples is equal to 20.

The Applicant studied various training and operation strategies in respect of the multilayer perceptron 16, and the most favorable results in terms of training time and computing costs were obtained with a hidden layer which comprises 20 neurons, and an activation function (the same for each neuron) which is the sigmoid function. The study of the value of the outputs of the multilayer perceptron 16 showed that a threshold at 0.5 on the output layer makes it possible to perform effective segregation and obtain a Gaussian distribution of the population, which confirms the quality of the results obtained.

This is enabled thanks to training of the multilayer perceptron 16 using 120 pulses which were generated by varying the trajectory and the parameters of the cell (the sphericity, the internal viscosity, the shear modulus of the membrane, etc.). The pulses were then formatted by the converter 14, and associated with an output value equaling 0 or 1 depending on whether the orientation of the cell at the maximum pulse amplitude was greater or less than 0.3 rad (threshold which makes it possible to retain the cells corresponding to trajectories 1 and 2 in FIG. 2). Then, the training was performed by stochastic gradient descent after error gradient back propagation. The algorithm ADAM (described in the article by Diederik et al: "A method for stochastic optimization" International Conference on Learning Representations, pages 1-13, 2015) is used for updating the weights and the training error is evaluated using the cost function based on the root mean square error.

Figure 6:
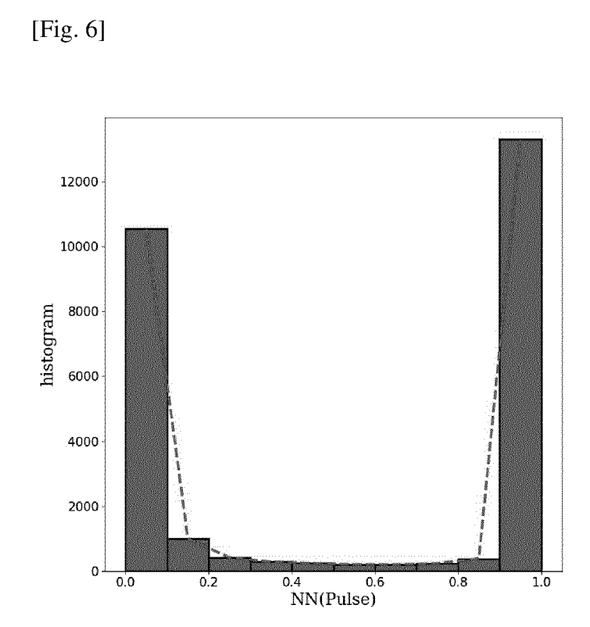
FIG. 6 represents a histogram of results on a real blood sample of the rotation value calculation by the second embodiment.

In order to validate this second embodiment, the trained multilayer perceptron 16 was tested on an experimental pulse acquisition performed using a fresh blood sample from a healthy patient on a system without hydrodynamic focusing. FIG. 6 shows the distribution of the predicted values by the neural network on the experimental pulses. Two high-concentration zones ([0; 0.1] and [0.9; 1]) are observed framing an intermediate low-concentration zone spread between 0.1 and 0.9. The high-concentration zones correspond to the pulses for which the model succeeds perfectly in deciding on the presence of rotation. The intermediate zone that the network has more difficulty processing, can be explained by pulse signatures not present in the digital training set, such as coincident passages or pulses outside the simulated parameter range, but also by errors and/or measurement noise. For all that, with a separation threshold at 0.5, the rotationless pulse population has a Gaussian distribution, which validates the results.

Although the Applicant had identified that the multilayer perceptron described above is particularly effective, the parameters of the model (number of hidden layers, number of inputs in the input layer, number of neurons in the hidden layer, activation function, cost function in training, other hyperparameters of the model) could obviously vary without deviating from the spirit of the invention. Further neural network architectures could also be envisaged (CNN or others).

In the above, the ranges and values have been described relative to a particular application to red blood cells and on a machine for which the measurement parameters can vary (voltage at electrodes, opening size, flow rate, etc.). Further applications could require an adaptation of these ranges and values.

The invention claimed is:

1. Device for medical analyses with cellular impedance signal processing, comprising:
a memory arranged to receive pulse data sets, each pulse data set comprising impedance value data that are associated each time with a time marker, said data together representing a curve of cellular impedance values that are measured as a cell passes through a polarised opening,
a calculator arranged to process a pulse data set by determining a rotation value indicating whether the cell from which this pulse data set has been obtained has undergone a rotation during its passage through the polarised opening, and
a classifier arranged to provide the calculator with a given pulse data set, and to use the resulting rotation value to classify the given pulse data set in a rotation pulse data set group or a rotationless pulse data set group.

2. The device according to claim 1, wherein the calculator is arranged to process a pulse data set by:
determining a maximum impedance value of the pulse data set,
calculating an upper impedance value by multiplying the maximum impedance value by an upper coefficient chosen in the range [0.7; 0.95], and by determining in the pulse data set the time markers for which the associated impedance value in the pulse data set is equal to the upper impedance value, and by calculating an upper duration corresponding to the maximum duration between these time markers,
calculating a lower impedance value by multiplying the maximum impedance value by a lower coefficient chosen in the range [0.1; 0.6], and by determining in the pulse data set the time markers for which the associated impedance value in the pulse data set is equal to the lower impedance value, and by calculating a lower duration corresponding to the maximum duration between these time markers,
returning a rotation value determined from a ratio calculated from the upper duration and the lower duration.

3. The device according to claim 2, wherein the upper coefficient is chosen in the range [0.8; 0.9].

4. The device according to claim 2, wherein the lower coefficient is chosen in the range [0.3; 0.6].

5. The device according to claim 2, wherein the upper coefficient equals 0.875 and the lower coefficient equals 0.5.

6. The device according to claim 2, wherein the calculator returns a rotation value equal to the division of the upper duration by the lower duration, and wherein the classifier is arranged to classify a pulse data set for which the rotation value is less than 0.45 in the rotation pulse data set group and to classify a pulse data set for which the rotation value is greater than 0.45 in the rotationless pulse data set group.

7. The device according to claim 1, wherein the calculator is a neural network comprising:
a converter arranged to process a pulse data set to adapt the pulse data set to processing by a neural network, arranged to make the time markers and the impedance values dimensionless and resample the dimensionless data to a chosen number of impedance values for the neural network, and,
a multilayer perceptron for which the input layer comprises an input for each value from the resampling performed by the converter, at least one hidden layer, and an output layer to determine a rotation value.

8. The device according to claim 7, wherein the input layer further comprises an input receiving the width of the pulse data set processed by the converter.

9. The device according to claim 7, wherein the multilayer perceptron comprises a hidden layer comprising 20 neurons, and the activation function of these neurons is the sigmoid function.

10. The device according to claim 7, wherein the multilayer perceptron is trained by stochastic gradient descent after error gradient back propagation, the training error being calculated from a cost function based on the root mean square error, and the outputs being set to 0 for the inputs for which the associated pulse data set have a cellular orientation greater than 0.3 rad for a maximum impedance value of the impedance values of this pulse data set, and 1 otherwise.

* * * * *